(12) United States Patent
Zhang et al.

(10) Patent No.: US 11,035,175 B2
(45) Date of Patent: Jun. 15, 2021

(54) DRILL BIT BODY CONSTRUCTION

(71) Applicant: SMITH INTERNATIONAL, INC., Houston, TX (US)

(72) Inventors: Youhe Zhang, Spring, TX (US); Huimin Song, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 285 days.

(21) Appl. No.: 15/966,004

(22) Filed: Apr. 30, 2018

(65) Prior Publication Data

US 2018/0320449 A1 Nov. 8, 2018

Related U.S. Application Data

(60) Provisional application No. 62/500,583, filed on May 3, 2017.

(51) Int. Cl.
*E21B 10/42* (2006.01)
*B23P 15/24* (2006.01)
(Continued)

(52) U.S. Cl.
CPC ............ *E21B 10/42* (2013.01); *B22F 7/062* (2013.01); *B22F 10/20* (2021.01); *B23P 15/24* (2013.01);
(Continued)

(58) Field of Classification Search
CPC ........ E21B 10/42; E21B 10/62; E21B 10/627; E21B 10/633; E21B 10/08; E21B 10/55; E21B 10/43; E21B 10/54; E21B 10/00; E21B 17/043; E21B 17/042; E21B 17/1092; B22F 3/1055; B22F 7/062; B22F 2005/001; B22F 2998/10; B33Y 80/00;
(Continued)

(56) References Cited

U.S. PATENT DOCUMENTS

| | | | |
|---|---|---|---|
| 5,101,692 | A | 4/1992 | Simpson |
| 5,433,280 | A | 7/1995 | Smith |

(Continued)

FOREIGN PATENT DOCUMENTS

| | | |
|---|---|---|
| CN | 204082014 U | 1/2015 |
| CN | 204920805 U | 12/2015 |

(Continued)

OTHER PUBLICATIONS

First Office Action and Search Report issued in Chinese patent application 201810399218.7 dated Nov. 4, 2020, 19 pages with English Translation.

*Primary Examiner* — George S Gray

(57) ABSTRACT

An example drill bit is formed by a bit head portion and a shank portion. The bit head portion includes a bit face, and the shank includes a bit portion and a bit connection. The bit connection is configured to be coupled to a drill string. The bit head and shank are configured to be secured together. When secured together, one or more blades that start near a central axis of the bit face continue to a gage portion of the bit and along at least a portion of the length of the bit portion of the shank. One or more anchoring elements are coupled to the bit head and the shank to restrict relative rotational or axial movement between the bit head and the shank.

20 Claims, 10 Drawing Sheets

(51) Int. Cl.
*B22F 7/06* (2006.01)
*B33Y 80/00* (2015.01)
*E21B 10/55* (2006.01)
*E21B 17/10* (2006.01)
*B22F 10/20* (2021.01)
*B22F 5/00* (2006.01)
*C22C 29/08* (2006.01)
*C22C 29/06* (2006.01)
*C22C 29/10* (2006.01)

(52) U.S. Cl.
CPC .............. *B33Y 80/00* (2014.12); *E21B 10/55* (2013.01); *E21B 17/1092* (2013.01); *B22F 2005/001* (2013.01); *B22F 2998/10* (2013.01); *C22C 29/06* (2013.01); *C22C 29/08* (2013.01); *C22C 29/10* (2013.01)

(58) Field of Classification Search
CPC ......... B23P 15/24; C22C 29/10; C22C 29/06; C22C 29/08; Y02P 10/25
See application file for complete search history.

(56) References Cited

U.S. PATENT DOCUMENTS

| | | |
|---|---|---|
| 6,454,030 B1 | 9/2002 | Findley et al. |
| 7,775,287 B2 | 8/2010 | Duggan et al. |
| 7,900,718 B2 | 3/2011 | Lyons |
| 8,309,018 B2 | 11/2012 | Smith et al. |
| 8,746,373 B2 | 6/2014 | Smith et al. |
| 9,163,461 B2 | 10/2015 | Smith et al. |
| 2002/0096306 A1* | 7/2002 | Butcher .................. B22D 19/14 164/332 |
| 2009/0032309 A1* | 2/2009 | Schwefe ............. E21B 17/1092 175/408 |
| 2009/0321139 A1* | 12/2009 | Strachan ................. E21B 10/43 175/61 |
| 2010/0108397 A1* | 5/2010 | Lyons ..................... E21B 10/00 175/408 |
| 2010/0193255 A1* | 8/2010 | Stevens ..................... B22F 3/26 175/435 |
| 2017/0037518 A1 | 2/2017 | Oxford et al. |
| 2017/0211331 A1 | 7/2017 | Vempati et al. |
| 2017/0226811 A1 | 8/2017 | Cunningham et al. |

FOREIGN PATENT DOCUMENTS

| | | |
|---|---|---|
| CN | 106320991 A | 1/2017 |
| WO | 2017070993 A1 | 5/2017 |

* cited by examiner

DRILL BIT BODY CONSTRUCTION

CROSS-REFERENCE TO RELATED APPLICATIONS

This application claims priority to, and the benefit of, U.S. Patent Application No. 62/500,583, filed May 3, 2017, which is expressly incorporated herein by this reference in its entirety.

BACKGROUND

Current methods of forming fixed cutter bits having polycrystalline diamond cutters thereon (often referred to as "PDC bits") may use molds and/or master patterns to define the shape of the PDC bit, where bit material may be placed in the mold around a metallic blank and infiltrated to form a bit body. Polycrystalline diamond ("PCD") cutters may then be brazed to the bit body to form the PDC bit. In many instances, the molds have several sections which are assembled together to form the mold. Moreover, specialized mold pieces are formed and incorporated into the mold for forming passages, canals, or cutaways through the PDC bit. To achieve desired tolerances, the molds are often machined.

Other methods of forming PDC bits may include forming a green bit around a metallic blank (e.g., by pressing bit material around the blank and/or by pre-sintering the bit material around the blank), milling the green bit into the shape of the PDC bit, and sintering the milled bit to form the PDC bit body. PCD cutters may be brazed to the bit body to form the PDC bit.

The steel blank used in forming a PDC bit may be welded to another piece of steel that has an API pin/box thread on one end (i.e., a threaded connection meeting the API (American Petroleum Institute) standards). The API pin/box thread connection may be used to connect the PDC bit to a drill string.

SUMMARY

According to some aspects of the present disclosure, a method of forming a bit includes forming a bit head, forming a shank, and attaching the bit head to the shank. The bit head may include a bit face having blades that extend radially outwardly and which define a gage of the bit head. The bit head may also include a shank connection at an opposite end of the bit head from the bit face. The shank may include a bit head connection at a first end of the shank, which first end of the shank may have an outer diameter extending to the gage of the bit head. A bit connection may be at the second end of the shank, which is opposite the first end of the shank. When attaching the bit head to the shank, the shank connection of the bit head and the bit connection of the shank may be used. Additionally, at least one anchoring element may be inserted through an opening defined by at least one of the bit head or the shank when attaching the bit head to the shank.

In accordance with one or more further aspects of the present disclosure, a bit may include a bit body that includes a bit head formed of at least one matrix material, a shank formed of a shank material different from the at least one matrix material, and a threaded connection between the bit head and the shank. Blades extend radially outwardly from and axially along the bit body, and define a gage region of the bit. An anchoring element is in a locking pocket in the gage region of the bit and at an interface between the bit head and the shank, while a bit connection is also coupled to the bit body.

According to one or more additional aspects, a bit may include a bit body and a shank. The bit body includes one or more first blade portions, and the shank includes one or more second bit portions. When the bit body and the shank are secured together, the one or more first blade portions of the bit body align with the one or more second bit portions of the shank to collectively create blades that extend along the bit body and the shank. One or more locking pockets in the bit body, the shank, or both, may receive anchoring elements that resist relative movement between the bit body and the shank once secured together. Optionally, the locking pockets may be formed partially in each of the first and second bit portions.

In at least one or more aspects, a bit includes a bit body having a bit head, a shank, and a threaded connection that secures the bit head to the shank. Blades extending radially outwardly from a central axis of the bit body have an outer surface that defines a gage region. The blades are formed by separate portions on the bit head and on the shank, and portions of the blades on the shank form greater than 50% of a length of the gage region. A bit connection is also coupled to a shank of the bit body.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and features of the described and claimed embodiments of the present disclosure will be apparent from the following description and the appended claims.

DETAILED DESCRIPTION

Fixed cutter drill bits—including metal matrix drill bits—can include a bit body and blades extending outwardly and azimuthally from the bit body. The blades extend along a length the drill bit from an axial end of the bit (the bit crown) to an intermediate axial point that is between the two axial ends of the fixed cutter bit. The radially outermost surfaces of the blades may define a gage or the outer diameter of the bit.

Cutting elements may be attached to the blades of a fixed cutter bit. Cutting elements can include planar or non-planar cutting elements, and may include an elongate and generally cylindrical tungsten carbide substrate that is received and secured in a pocket formed in the surface of the blades. The cutting elements may also include a hard cutting layer of polycrystalline diamond (PCD) or other superabrasive materials (e.g., thermally stable diamond or polycrystalline cubic boron nitride) on the substrate. For convenience, as used herein, reference to a "PDC bit" or "PDC cutters" refers to a fixed cutter bit or cutting element employing a hard cutting layer of polycrystalline diamond or other superabrasive materials.

PDC bits may further include a bit connection at an opposite axial end of the bit, as compared to the bit crown. The bit connection may extend axially downward from the bit crown, and may include a threaded pin. The threaded pin may have threads, including threads that meet American Petroleum Institute (API) standards, that have double shoulder connections, or the like. The bit connection may be connected to a drill string for use of the drill bit.

Some embodiments of the present disclosure relate generally to drill bits, including fixed cutter or hybrid drill bits, having improved bit connections and methods of making the same. In more particular embodiments, drill bits may be formed of two pieces threaded together. In some illustrative embodiments, one piece of a multi-piece drill bit may form part of a gage portion of the bit, and a second portion may form part of the gage portion of the bit. By forming the bit connection portion of a bit with the gage portion of the bit, the connection strength may be increased. In some embodiments, a bit crown or bit face portion may have a greater or lesser portion of the length of the gage portion of the bit, while the bit connection portion may have a corresponding lesser or greater portion of the length of the gage portion of the bit.

Figure 1:
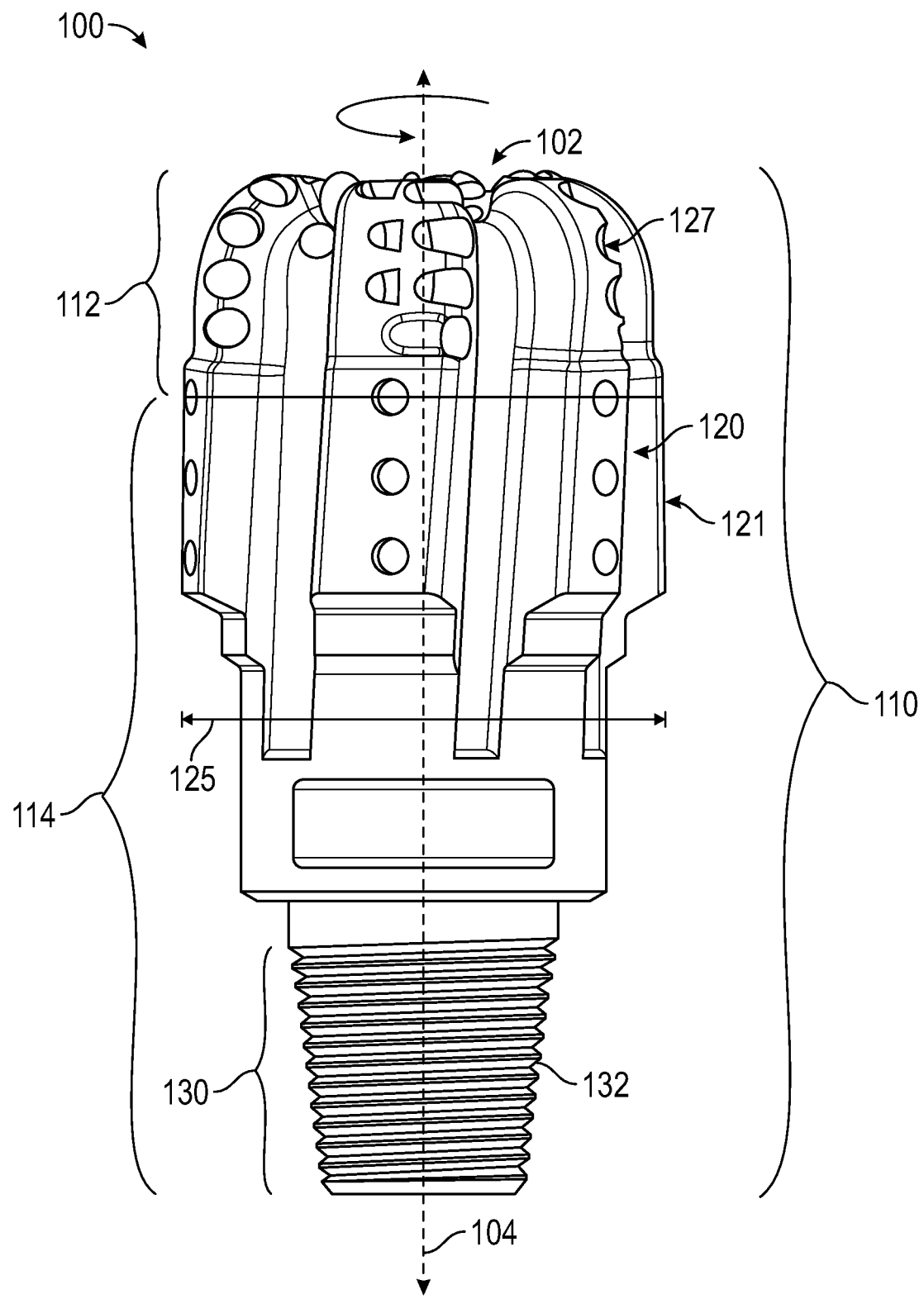
FIG. 1 is a side view of a drill bit, according to some embodiments of the present disclosure.
Figure 2:
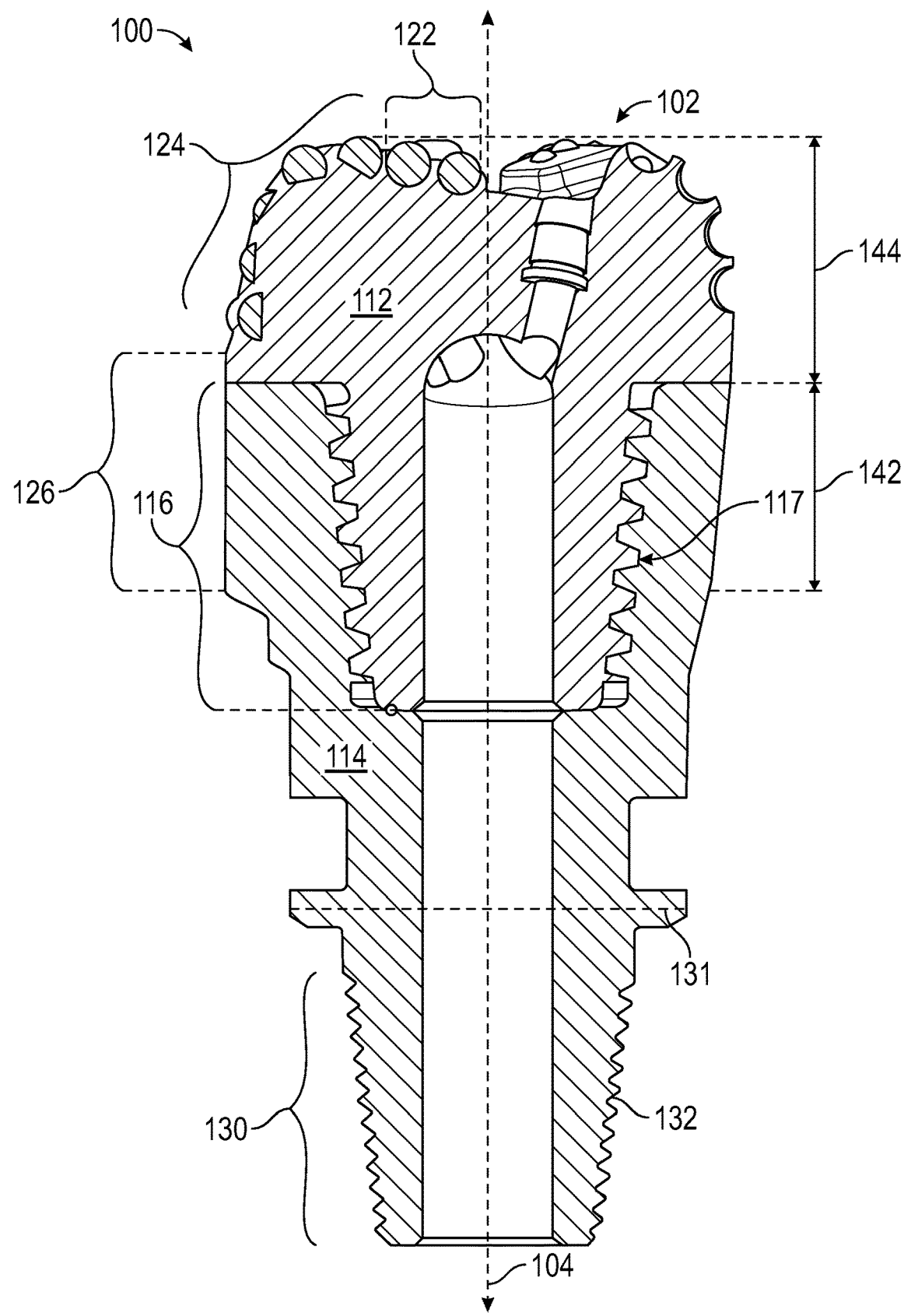
FIG. 2 is a cross-sectional view of the drill bit of FIG. 1.

FIGS. 1 and 2 are side and cross-sectional views, respectively, of an example of a fixed cutter bit 100 according to some embodiments of the present disclosure. The bit 100 has a bit body 110 that includes a bit head 112, a shank 114, and a threaded connection 116 used to couple the bit head 112 to the shank 114. A plurality of blades 120 extend outwardly from the bit body 110, and cutting elements (not shown) may be brazed, welded, or otherwise secured in cutter pockets 127 formed along one or more surfaces of the blades 120. The bit 100 further includes a bit face 102 at a first axial end and a bit connection 130 at an opposing, second axial end of the bit 100. A central longitudinal axis 104 extends axially through the axial ends of the bit 100, and the bit 100 can rotate in a cutting direction about the central axis 104. In FIG. 1, the arrow illustrates the cutting direction, which is generally in a direction that allows polycrystalline diamond or other superabrasive materials on a cutting element coupled to a blade to rotationally lead a substrate of the cutting element.

As shown, the blades 120 extend axially and radially from the bit face 102, and may also extend rotationally around the bit body 110. In FIG. 1, the blades 120 are shown to extend axially from the bit face 102 at the first axial end, and an axial distance along the bit body 110 to an axial position offset from the bit face 102. The blades 120 may have a blade profile generally divided into three regions conventionally labeled cone region 122, shoulder region 124, and gage region 126. The cone region 122 includes the radially innermost region of bit 100 and extends generally from the central axis 104 to the shoulder region 124. The cone region 122 may have a generally concave shape at the centermost portion thereof. Adjacent the cone region 122 is the shoulder (or the upturned curve) region 124, which may have a generally convex shape. Moving radially outward, adjacent the shoulder region 124 is the gage region 126, which may extend about parallel to the central axis 104 at the outer radial periphery of the blade profile having gage diameter 125. In some embodiments, the gage region 126 may have a slight taper. For instance, the gage region 126 may, when viewed in an axial direction extending toward the bit shank 114, taper inwardly. The taper angle may be between 0° and 5° in some embodiments.

In the embodiment of FIG. 2, portions of the blades 120 defined by the shank 114 may form a majority of an axial length of the gage region 126. For example, according to embodiments of the present disclosure, portions of the blades 120 extending from the shank 114 may form greater than 50%, 60%, 75%, or 90% of the axial length of the gage region 126 of the blades 120. In one or more embodiments, the gage region 126 of the blades 120 begins in the bit head 112 and ends in the shank 114. For example, in such embodiments at least 2%, 5%, 10%, or 20% of the axial length of the gage region 126 of the blades 120 may extend from the bit head 112. In other embodiments, the shank 114 may define greater than 90% or less than 50% of the axial length of the gage region 126, or the bit head 112 may define more than 20% or less than 2% of the axial length of the gage region 126.

The axial length 142 of the gage region 126 formed by portions of blades 120 on the shank 114 of the bit 100 may, in some embodiments, be greater than the axial length 144 of the bit face portion of the bit head 112, where a bit face portion of a bit head 112 refers to the portion of the bit head 112 that forms the bit face 102 and is exposed above the shank 114 of the bit 100, when the bit head 112 and shank 114 are coupled together. A bit head 112 may be described as having two regions or portions, including a bit face portion and a threaded connection portion, where the threaded connection portion includes the portion of the bit head 112 forming the threaded or other connection that mates with the shank 114, and the bit face portion includes the portion of the bit head 112 axially adjacent the threaded connection portion. In some embodiments, the axial length 142 of a gage region formed by the shank 114 of a bit 100 may be less than or equal to the axial length 144 of a bit face portion of the bit head 112 of the bit 100.

Further, in some embodiments, the axial length 144 of a bit face portion of the bit head 112 may be relatively smaller as compared to the axial length of a threaded connection 116 between the bit head 112 and the shank 114. By providing a relatively shorter bit face portion of the bit head 112, the threaded connection 116 may be subjected to reduced bending stresses during use of the bit.

The shank 114 may further have a bit connection 130, or pin, formed at an axial end of the shank 114, and opposite the portion of the shank 114 that makes with the bit head 112. The bit connection 130 may have a plurality of threads 132 formed around the circumference of the bit connection 130. The bit connection 130 may be a pin connection or box connection, and may have threads 132 with a suitable pitch (i.e., distance between the thread peaks), threads per inch, and height (i.e., distance between a root, or an innermost point, of the thread to the peak, or outermost point, of the thread). Threads 132 may have any suitable configuration, and may be tapered or straight, may be API connections, double shoulder connections, or the like. The threads 132 may be configured to mate with a drill collar, or other component of a bottomhole assembly (BHA) or drill string.

The threaded connection 116 coupling the bit head 112 to the shank 114 may also include a plurality of threads 117, which may also have suitable pitch, height, number of threads per inch, shape, and other configurations. According to some embodiments of the present disclosure, the pitch between threads 117 of the threaded connection 116 may be larger than the pitch between threads 132 of the bit connection 130. In some embodiments, the height of the threads 117 of the threaded connection 116 may be larger than the height of the threads 132 of a bit connection 130. Further, in some embodiments, the threads 117 may be straight while the threads 132 may be tapered, both threads 117 and 132 may be tapered, both threads 117 and 132 may be straight, or the threads 117 may be tapered while the threads 132 may be straight.

Threads 117 of the threaded connection 116 between a bit head 112 and a shank 114 may also have different thread profiles in different embodiments. For example, threads 117 may have a buttressed thread profile or a unified thread profile. Further, threads 117 of a threaded connection 116 between a bit head 112 and a shank 114 may have thread profiles that either meet API standards or that do not meet API standards. The threads 117 may meet ACME standards in some embodiments.

Figure 3:
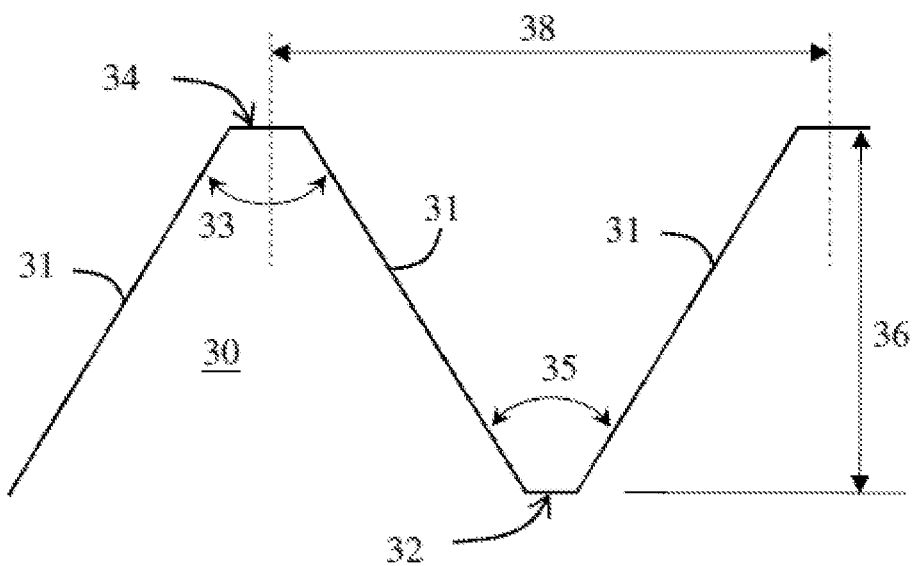
FIGS. 3 and 4 show thread profiles of threaded connections, according to some embodiments of the present disclosure.

FIG. 3 shows an example of threads 30 having a unified thread profile, according to some embodiments of the present disclosure. The threads 30 have opposing flanks 31 extending in a V-shape profile, from a root 32 of the thread to opposing peaks 34 of the thread 30. The flanks 31 extend downwardly and outwardly from a common peak 34 at an included peak angle 33. Further, flanks 31 of adjacent threads 30 meet at the root 32 between the adjacent threads 30 at an included root angle 35. The peak angle 33 may be the same as or different from the root angle 35. In the embodiment shown, the peak 34 and the root 32 each have a planar profile; however, in some embodiments, thread peaks and/or roots may have curved, pointed, asymmetric, wedged, or other profiles. The threads 30 have a height 36 extending from the thread root 32 to the thread peak 34. Further, adjacent threads 30 are spaced apart by a pitch 38, where the pitch 38 is measured between centers of the peaks 34 of adjacent threads 30.

Figure 4:
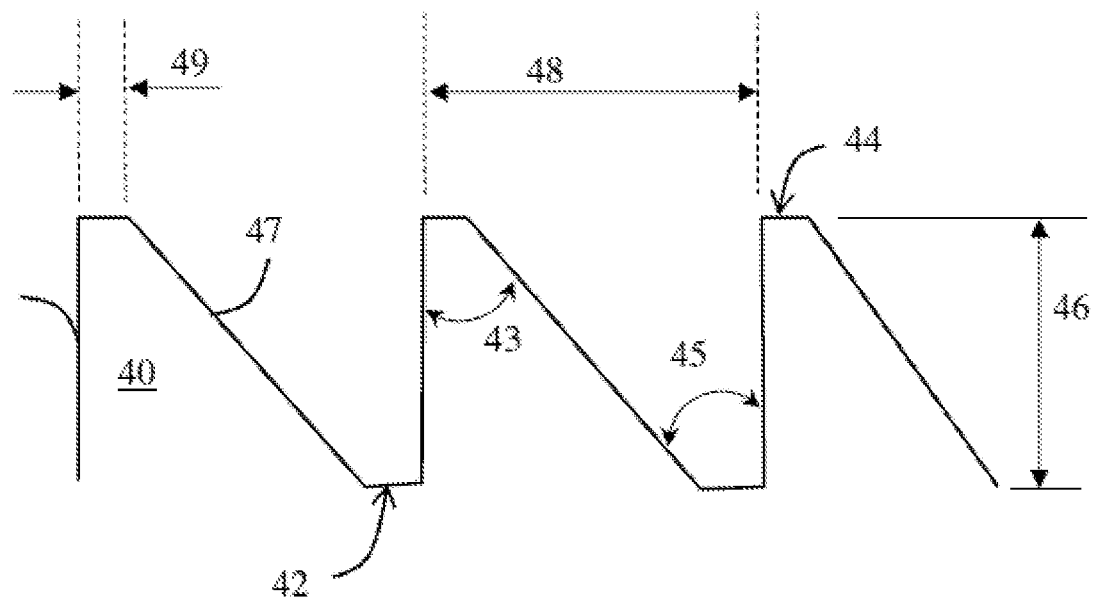

FIG. 4 shows an example of threads 40 having a buttressed thread profile. The threads 40 have opposing flanks 41, 47. A first flank 41 extends substantially perpendicularly from or at a slight slant angle from a root 42 of the thread 40 to a peak 44 of the thread 40, while a second flank 47 extends at an included peak angle 43 from the first flank 41 between the peak 44 and the root 42. Further, flanks 41, 47 of adjacent threads 40 meet at the root 42 between the adjacent threads 42 at an included root angle 45. The peak angle 43 may be the same as or different than the root angle 45. In the embodiment shown, the peak 44 and the root 42 each have a planar profile, however the peak 44 or root 43 may have other profiles, such as those discussed with respect to the threads 30 of FIG. 3. The profile of the peak 44 may have a width 49, and adjacent threads 40 are spaced apart by a pitch 48, where the pitch 48 is measured between the peaks 44 of adjacent threads 40. Further, the threads 40 have a height 46 extending from the thread root 42 to the thread peak 44.

According to some embodiments of the present disclosure, a threaded connection between a bit head and a shank of a bit may be axially spaced from a bit connection of the bit, where the threaded connection and the bit connection optionally share the same central longitudinal axis. Further, bits according to embodiments of the present disclosure may include a threaded connection between a bit head and a shank, where the threaded connection extends concentrically with and interior to a gage region of the bit.

For example, referring again to FIG. 2, the bit 100 includes a threaded connection 116 that is concentric with and interior to the outer gage surface(s) of the gage region 126 of the bit 100. As shown, the threaded connection 116 may extend an axial length greater than the axial length of the gage region 126, such that a portion of the threaded connection 116 does not share an axial position with the gage region 126 (e.g., extends axially further than the gage region 120, and closer to the bit connection 130). In some embodiments, a threaded connection 116 may have an axial length that is equal to or less than the axial length of a gage region of a bit. In such embodiments, at least a portion of the threaded connection 116 may share an axial position along the bit with the gage region, such that a cross-section at an axial position may include a portion of the gage region and a portion of the threaded connection. In some embodiments, a threaded connection between a bit head and shank may be axially offset from a gage region of a bit, such that a full or partial axial length of the threaded connection does not share an axial position with the gage region.

According to some embodiments of the present disclosure, a bit may include a bit body having a bit head, a shank, and a threaded connection between the bit head and the shank, and a plurality of blades extending outwardly from the bit body to a gage of the bit. Optionally, one or more additional elements or features may anchor the bit head to the shank. For instance, a weld or adhesive, may be used at an interface of the bit head 112 and the shank 114 to anchor the bit head 112 to the shank 114 by resisting relative axial or rotational motion of the bit head 112 to the shank 114. In other embodiments, one or more other anchoring elements may be used. For instance, an anchoring pin may be positioned in a locking pocket formed in a gage or other portion of the bit, and between the bit head and the shank.

Figure 5:
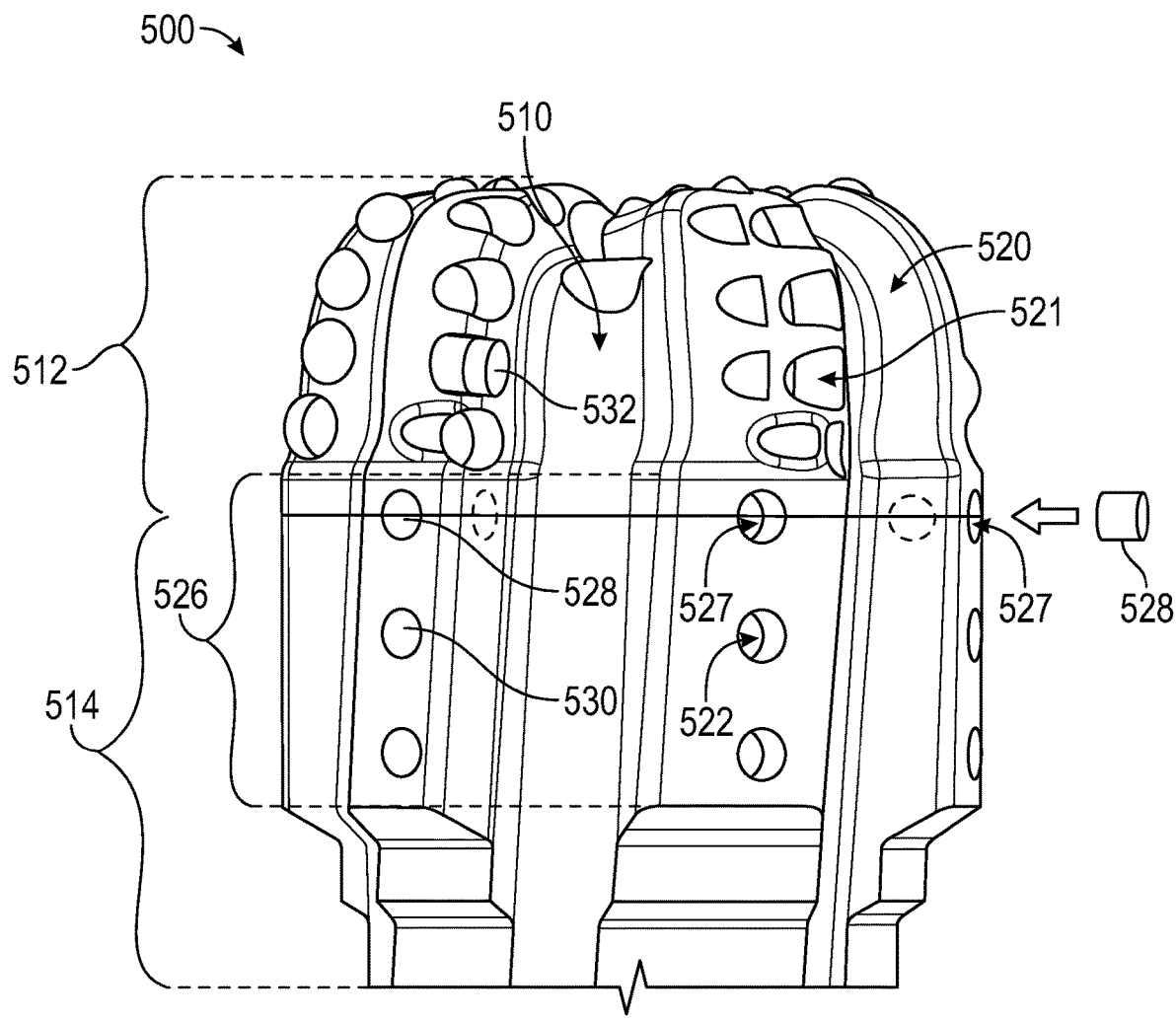
FIG. 5 is a side view of a drill bit, according to some embodiments of the present disclosure.

For example, FIG. 5 shows a perspective view of a bit 500 according to some embodiments of the present. The bit 500 has a bit body 510 including a bit head 512 connected to a shank 514 (e.g., by a threaded connection). A plurality of blades 520 extend radially outwardly from the bit body 510 and extend axially a length along a bit face and along a periphery of the bit 500. Portions of the blades 520 extending to the gage of the bit 500 may be referred to as the gage region 526 of the blades 520.

According to some embodiments, one or more locking pockets 527 may be formed along the gage region 526 of the blades 520. The locking pockets 527 are optionally positioned within the bit head 512 and within the shank 514. For example, in the embodiment shown, a locking pocket 527 defines a cylindrical space, where a portion (e.g., half) of the locking pocket 527 is formed in an outer surface of the bit head 512 and a portion (e.g., half) of the locking pocket 527 is formed in an outer surface of the shank 514. Locking pockets 527 may be formed along an outer surface of a bit between a bit head and a shank, such that a portion of the locking pocket is formed by the bit head and the other portion of the locking pocket is formed by the shank. A locking pocket may be formed by a bit head and a shank of a bit, with different portions of the locking pocket formed by each of the bit head and the shank of the bit. For instance, a ratio of a volume of a locking pocket formed in the bit head to the volume of the locking pocket formed in the shank of the bit may be within a range having a lower value, an upper value, or lower and upper values including any of 20:80, 30:70, 40:60, 50:50, 60:40, 70:30, 80:20, or values therebetween. In other embodiments, the ratio may be less than 20:80 or greater than 80:20. Further, differently shaped locking pockets may be formed between bit head and shank pieces of bits, for example, locking pockets defining non-cylindrical spaces such pockets having rectangular, elliptical, trapezoidal, tear-drop, or other cross-sectional shapes. In some embodiments, the cross-sectional shape may vary in size or shape across a length of the pocket.

When the bit head 512 is mated to the shank 514 (e.g., by using a threaded connection), portions of the blades 520 defined by the bit head 512 may be aligned with portions of the blades 520 defined by the shank 514. This alignment may also align portions of the bit head 512 and shank 514 that define the locking pockets 527. An anchoring element 528 may then be positioned in the locking pockets 527, and may have dimensions that fit within the locking pocket 527. For example, an anchoring element 528 may have an outer diameter substantially equal to an inner diameter of a locking pocket 527, with tolerances sufficient to allow the anchoring element to be inserted into the locking pocket 527. By fitting an anchoring element 528 into a locking pocket 527 defining a space corresponding in shape with the anchoring element 528, the anchoring element 528 may restrict and potentially prevent rotational movement between the bit head 512 and the shank 514.

Further, an anchoring element may be formed of a material capable of withstanding rotational load between the bit head and shank. Suitable material for forming an anchoring element may include, for example, tungsten carbide or other carbide material, where the material forming the anchoring element may be at least as hard as, or harder than, the material forming the blades 520 of the bit head 512 and shank 514. In some embodiments, anchoring elements 528 may be used as gage protection elements, and may include tungsten carbide inserts, PDC cutters, diamond impregnated inserts, or other elements having a wear resistance that may be equal to or greater than a wear resistance of the blades 520.

An anchoring element may also have a cross-sectional shape (along a cross section perpendicular to a longitudinal axis of the anchoring element) capable of withstanding rotational load between the bit head and shank. For example, in the embodiment shown in FIG. 5, the anchoring element 528 may have a circular cross-sectional shape. Anchoring elements may have other cross-sectional shapes as discussed herein.

One or more locking pockets and anchoring elements of corresponding shapes may be positioned along an outer surface of a bit at an interface between a bit head and a shank (e.g., at gage portions of blades 520, within junk slots between blades 520, etc.). When assembled, a corresponding locking pocket and anchoring element may share a central longitudinal axis and may have substantially the same cross-sectional profile along a cross-section perpendicular to the central longitudinal axis of the locking pocket and anchoring element. The size and shape of the cross-sectional profile of a locking pocket and corresponding anchoring element may be designed to provide an opposing load to a bit head and a shank of a bit when the bit head and/or shank is subjected to rotational forces (e.g., during drilling or other use of the drill bit). For instance, an anchoring element may provide an opposing load to the side wall of a locking pocket formed by the bit head and shank of a bit, where the opposing load may inhibit or even prevent the bit head and shank from rotating relative to each other (thereby inhibiting or even preventing the unthreading of the bit head from the shank).

A locking pocket 527 may be formed to allow the anchoring element 528 to be inserted from any of a variety of directions. As shown in FIG. 5, for instance, the anchoring element 528 may be inserted into the locking pocket 527 from an opening in the outward, formation facing surface of a blade or gauge pad. In such an embodiment, the locking pocket 527 may extend radially inwardly, generally toward a longitudinal axis of the bit 500. In other embodiments, however, the locking pocket 527 may be formed to allow insertion in other directions. Pockets may instead (or additionally) be formed to define openings in the leading or trailing faces of blades 520, as reflected by the dashed circles shown in FIG. 5. In such embodiments, an anchoring element 528 may be inserted through the leading or trailing face of the blade 520, and the pocket may extend in a generally circumferential direction around the longitudinal axis of the bit 500.

With continued reference to FIG. 5, the bit 500 may further have a plurality of pockets 521, 522 formed in the blades 520. The pockets 521, 522 may include gage pockets 522 formed along an outer surface in the gage region 526 of the blades 520, and cutter pockets 521 formed along outer surfaces in shoulder and nose regions of the blades 520. Cutting elements may be positioned and secured in the pockets 521, 522 (e.g., by brazing, press-fit, or with mechanical fasters) to provide cutting action and/or wear protection to the blades 520. For example, a plurality of gage elements 530 may be positioned in gage pockets 522 on the outer surface of the gage region 526 of the blades 520, and a plurality of PDC cutters 532 may be secured in the cutter pockets 521. It is noted that locking pocket 527 may be a particular type of gage pocket 522 that is formed at the outer surface in the gage region 526, but which is formed in part by the bit head 112 and in part by shank 114, as discussed herein.

Drill bits according to embodiments of the present disclosure may be formed by making a bit head and a shank as separate pieces and attaching the bit head to the shank. The bit head may be a fixed cutter drill bit in which each blade is a fixed cutter, a hybrid bit including both roller cone and fixed blades, impregnated drill bits, or other types of bits. Example bits may have one or more blades at a bit face that extend radially outwardly to a gage of the bit and a shank connection at an opposite end of the bit head from the bit face. The shank may be formed to have a bit head connection at a first axial end of the shank and a bit connection at a second axial end of the shank opposite the first axial end. A bit head and a shank may be coupled together to form a bit, for example, by threading the bit head to the shank, where the shank connection and bit head connection are each threaded connections. A bit connection that is integral with or connected (e.g., welded) to the shank, as shown by dashed line 131 of FIG. 2, may also be a threaded connection. In methods having a bit head threaded to a shank, the shank connection formed on the bit head and the bit head connection formed on the shank may have correspondingly shaped threads that may interlock upon screwing the bit head to the shank.

A bit head part and a shank part may be formed of the same or different materials. For example, a bit head and shank may both be formed of steel, titanium, a metal matrix material, or another material. In other embodiments, a bit head may be formed of at least one matrix material, such as tungsten carbide, and a shank may be formed of a material different from the matrix material of the bit head, such as a different metal matrix material, steel, or titanium. In some embodiments, a bit head or shank may be formed of multiple materials. For example, a matrix material such as a transition metal carbide may form at least part of a bit face portion of the bit head, and a steel or mixture of steel and a transition metal carbide may form at least part of a threaded connection portion of the bit head. Likewise, in some embodiments, a shank may be formed of multiple types of materials, for example, a relatively harder steel at a first axial end of the shank and a relatively softer steel at a second, opposite, axial end of the shank. By forming portions of the bit head and shank with different types of materials, the shank connection of the bit head and the bit head connection of the shank may be formed of materials having relatively closer material properties (e.g., relatively closer coefficients of expansion or relatively closer toughness), which may provide the bit with a better connection between the bit head and shank, while also allowing the axial ends of the bit to be formed of materials suitable for their intended use (e.g., a harder and/or more wear resistant material for forming a cutting end of the bit and a softer material for forming the bit connection according to API or other threaded connection standards).

Figure 6:
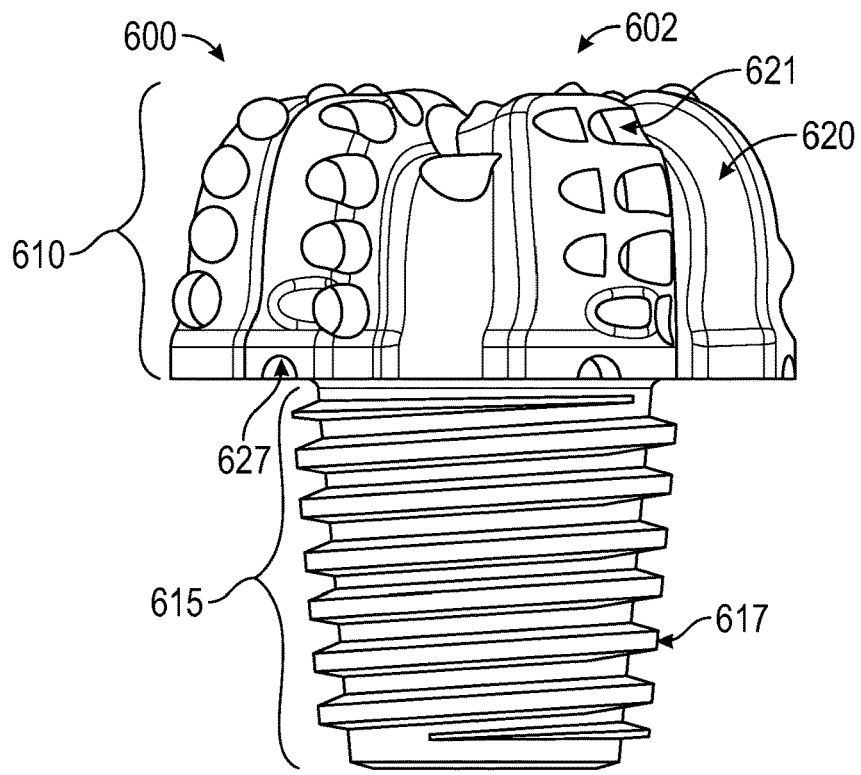
FIG. 6 is a side view of a bit head of a drill bit, according to some embodiments of the present disclosure.
Figure 7:
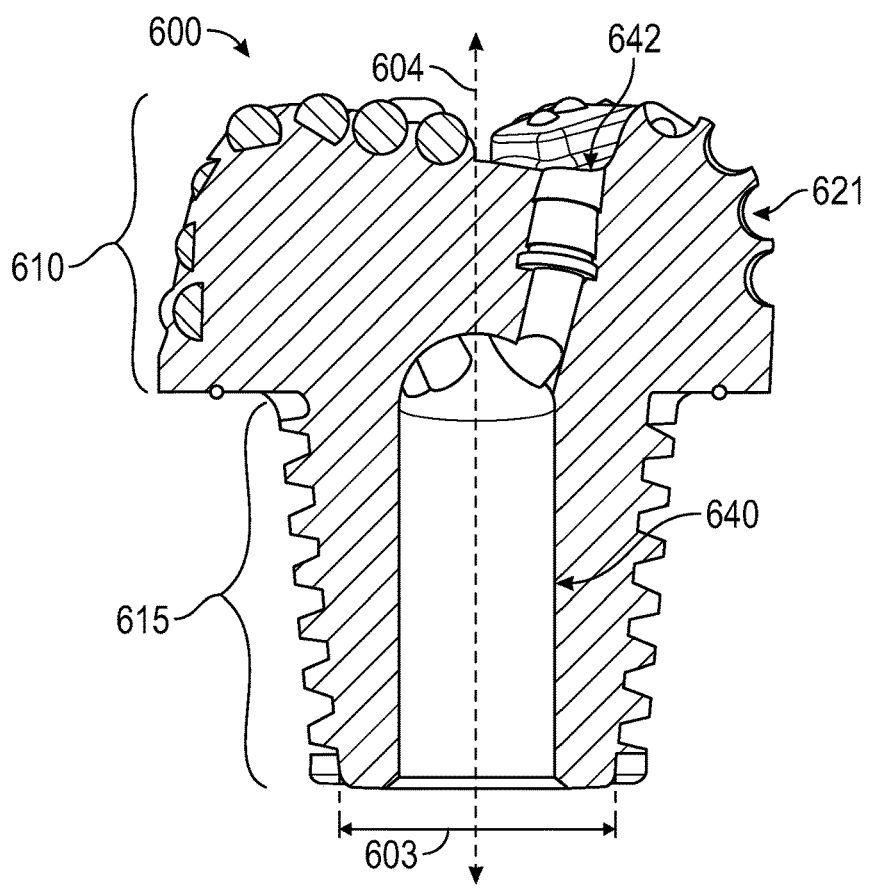
FIG. 7 is a cross-sectional view of the bit head of FIG. 6.

FIGS. 6 and 7 are a side and cross-sectional views, respectively, of an example of a bit head 600 formed according to some embodiments of the present disclosure. The bit head 600 includes a bit face portion 610 and a threaded connection portion 615. The bit face portion 610 may form the bit face 602 that may contact and engage a formation during drilling, and the threaded connection portion 615 may form the connection.

A plurality of spaced apart blades 620 are formed around the bit face portion 610 of the bit head 600. The blades 620 extend radially across the bit face and axially down the axial length of the bit face portion 610. The blades 620 terminate at different circumferential/azimuthal positions around the perimeter of the bit 600. A portion of a locking pocket 627 may be formed at the axial end of the outer surface of the blades 620. When the portion of the locking pocket 627 on the bit head 600 is aligned with another portion of the locking pocket on a shank (see FIG. 8), an anchoring element may be inserted into the locking pocket. Further, a plurality of cutter pockets 621 may be formed along an outer surface of the blades 620, which may receive cutters (e.g., planar or non-planar PDC cutters).

The threaded connection portion 615 of the bit head 600 may have a generally cylindrical shape or a truncated cone shape. As shown, the threaded connection portion 615 has a diameter 603 that is tapered and gradually decreases along a central axis 604 of the bit head 600 from proximate the bit face portion 610 of the bit head 612 to the opposite axial end of the threaded connection portion 615. Further, a thread 617 having one or more thread starts may wind helically around the threaded connection portion and axially along the axial length of the threaded connection portion 615.

A fluid passage 640 may be formed through the interior of the bit head 600 and extend substantially the entire axial length of the bit head 600. In the embodiment shown, the fluid passage 640 may include a central fluid passage extending through the threaded connection portion 615 of the bit head and one or multiple fluid passage branches extending through the bit face portion 610 of the bit head from the central fluid passage. The fluid passage branches may extend to nozzle openings 642 at the bit face 602 (e.g., in junk slots between blades of the bit face 602). In operation, drilling fluid flowing through a drill string may enter and be directed through the central fluid passage of a made-up drill bit. The fluid may flow through the bit out of a nozzle of the bit, where the drilling fluid may cool the bit and direct cuttings away from the bit face 602.

Figure 8:
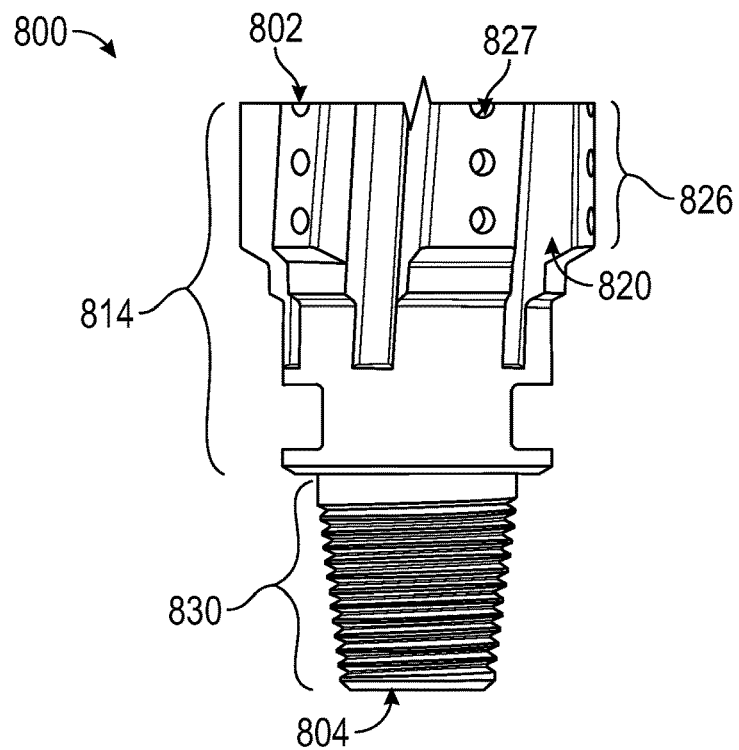
FIG. 8 is a side view of a shank of a drill bit, according to some embodiments of the present disclosure.
Figure 9:
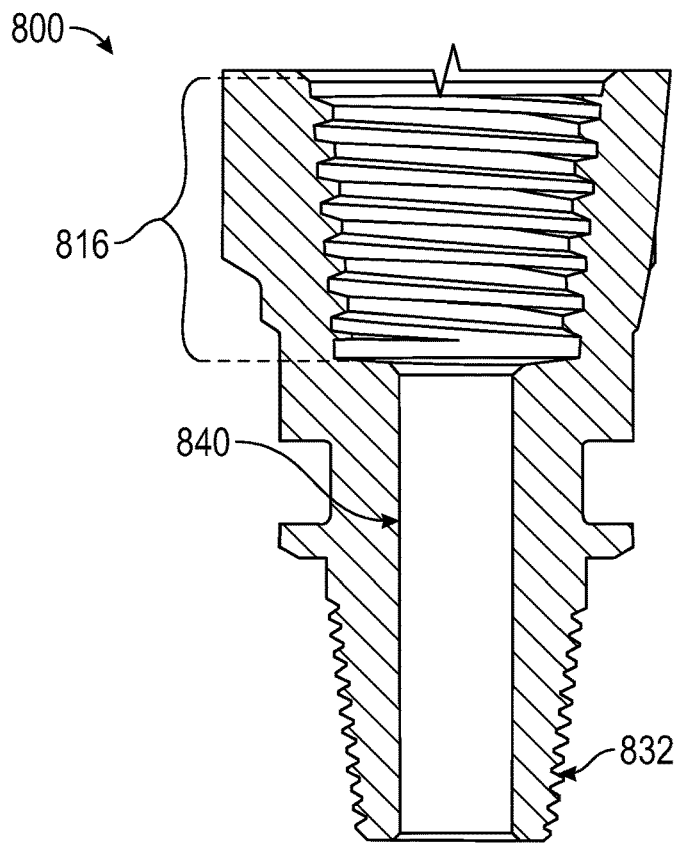
FIG. 9 is a cross-sectional view of the shank of FIG. 8.

FIGS. 8 and 9 are side and cross-sectional views, respectively, of an example of a shank 800. The shank 800 may include a bit portion 814 and a connection portion 830. A connection 816 may be formed as a box connection in the bit portion 814, and open at a first axial end 802 of the shank 800. The connection 816 may be configured to couple to a pin connection of a bit head (e.g., threaded connection portion 615 of FIG. 7). The connection portion 830 is a threaded bit connection formed at a second axial end 804 of the shank 800 opposite the first axial end 802. A thread 832 having one or more thread starts may extend helically around the connection portion 830 and axially along the length of the connection portion 830. The connection portion 830 may be a pin connection or a box connection.

A fluid passage 840 extends axially through the shank 800 from an opening at the second axial end 804 to an opening at a base of the bit head connection 816. When the shank 800 is connected to a bit head, the fluid passage 840 may be in fluid communication with a fluid passage extending through the bit head.

The bit portion 814 of the shank 800 may have a plurality of gage pads 820 formed at different spaced apart circumferential/azimuthal positions around the perimeter of the shank 800. When connected to a bit head, the gage pads 820 may align with blades formed on the bit head, and the aligned gage pads optionally form a portion 826 of the gage region of the blades. Further, a portion of a locking pocket 827 may be formed in an outer surface of the gage pads 820 where the gage pads terminate at the first axial end 802 of the shank. When connected to a bit head, the portion of the locking pocket 827 may be aligned with another portion of the locking pocket formed in an outer surface of a blade on the bit head. Once the portions of the locking pocket on the bit head and shank are aligned, an anchoring element may be threaded, placed, or otherwise inserted into the locking pocket to inhibit relative rotation between the bit head and shank.

In the embodiment shown, the connection 816 for coupling to the bit head extends an axial distance from the first axial end 802 of the shank 800 into the interior of the shank 800. The axial distance the connection 816 extends may be greater than the axial length of the gage pads 820, such that a portion of the bit head connection 816 does not axially overlap the gage pads 820. In some embodiments, a threaded connection 816 may extend an axial distance from a first axial end of a shank that is equal to or less than the axial length of gage pads extending from the first axial end of the shank.

Further, in the embodiment shown, the axial length of the connection 816 for coupling to the bit head is greater than the axial length of the threaded bit connection 830. In some embodiments, the axial length of a connection 816 formed in a shank 800 may be equal to or less than the axial length of a bit connection 830. The size and spacing of the threads forming a threaded connection between a bit head and shank may be the same or different than the size and spacing of the threads forming a connection to a drill string, and may provide different connection strengths or provide different sealing surfaces areas during bending, in some embodiments. For example, relatively larger threads may be provided on a threaded connection between a bit head and shank as compared to threads provided on a threaded bit connection, where the relatively larger threads may carry greater torque. According to some embodiments, a threaded connection between a bit head and shank may be stronger than a threaded bit connection between a drill bit and drill string, so when forces during use subject the bit to failure, the bit connection between the drill bit and drill string fails before the connection between the bit head and the shank.

According to embodiments of the present disclosure, a bit head may be formed by molding the part in a mold having the general negative shape of the bit head. For example, a mold having a general negative shape of a bit head may be provided, where cutter blanks may be positioned along the mold in positions the cutter pockets and/or the locking pocket is to be formed, and displacements positioned along the mold in areas of nozzles or fluid passages. A matrix material may be mixed with a metallic binder and placed in the mold. Suitable matrix materials for forming a bit head may include, for example, transition metal carbides such as macro-crystalline or cast tungsten carbide, titanium carbide or tantalum carbide, as well as carburized or cemented tungsten carbide. Suitable metallic binders may include, for example, cobalt, iron, nickel and alloys thereof, copper and copper alloyed with nickel, manganese, zinc, tin, or a combination thereof. After the particles in the matrix material mixture are poured or otherwise placed in the mold, the mixture may be heated to a point just below the melting point of the metallic binder, and bonds may be formed between the metallic binder and the matrix material by diffusion bonding or by liquid phase material transport, thereby sintering the matrix material mixture to form the bit head.

In some embodiments, a matrix material may be loaded into a mold of the bit head, where a slug or cubes of metallic binder may be placed adjacent the matrix material in the mold. The mold and its contents may be placed into a furnace to heat the metallic binder to its melting point. By capillary action and gravity, the molten metallic binder infiltrates the metallic binder into the mold, thereby binding the contents of the mold together. In some embodiments, the bit head may be formed by machining steel, titanium, or some other metal or metal alloy. In further embodiments, a bit head may be formed by direct 3D printing or other additive manufacturing. For instance, the bit head may be printed layer-by-layer with tungsten carbide and a binder fused (sintered) together using a laser, electron beam, or the like. In other cases, the bit head could be printed with a synthetic binder (polymer, organic, etc.) to first form a green body, and a subsequent infiltration process may be used to introduce a metallic or other binder material.

According to embodiments of the present disclosure, a shank may be formed by providing a block of steel and machining features of the shank into the block of steel. For example, a plurality of spaced apart gage pads may be machined into a block of steel by removing portions of steel between the circumferential positions around the perimeter of the block of steel where the gage pads are to be (where the remaining spaces between the gage pads may be referred to as junk slots). Such a machining process may produce junk slots between the gage pads. When the junk slots are machined prior to connecting the shank to the bit head, the junk slot and gage pad size and positions may be designed to correspond with the size and positions of blades formed around a bit head such that when the shank is connected to the bit head, the blades around the bit head align with the gage pads around the shank. In some embodiments, junk slots may be machined out of a block of steel for forming gage pads after connecting a shank to a bit head. When the junk slots are machined after connecting the shank to the bit head, the junk slots may be machined out of the shank to form gage pads corresponding in circumferential spacing and width with blades formed on the bit head. According to some embodiments, the shank may be produced in other manners, such as through a molding or additive manufacturing method as discussed herein in connection with the manufacture of bit heads.

In accordance with some embodiments in which a bit head, shank, or both a bit head and a shank are formed by additive manufacturing methods, a composition may be deposited layer-by-layer into the three-dimensional structure of the bit or shank. Methods of depositing a material composition by additive manufacturing may use an additive manufacturing deposition device, where each layer may be deposited by one or more feeders from the deposition device. Each successively deposited layer of material may be deposited according to a cross-sectional pattern of the part, to build the three-dimensional geometry of the part.

The material composition of each layer, as well as the physical design parameters of each layer (e.g., shape of the outer perimeter of each layer, area of each layer, and thickness of each layer), may be designed prior to deposition using a software modeling program, such as a computer aided design ("CAD") system. For example, according to embodiments of the present disclosure, a method of making a bit head and/or a shank may include modeling the part using a software modeling program (where the part model may have a designed composition, including an axial gradient composition, and designed physical parameters, such as shape and size), dividing the part model into multiple planes, and mapping the composition of the planes into grid patterns. Each layer deposited during the deposition process to build the three-dimensional part may be deposited according to a grid pattern.

Additive manufacturing may allow for bit heads and/or shanks to be formed by depositing sequential or successive layers of selected material in designated regions. In some embodiments, a method of manufacturing a bit head and/or shank includes depositing a first layer on a substrate and depositing multiple sequential layers at least partially adjacent the first layer. In one or more embodiments, at least a portion of multiple sequential layers are made of the same material mixture or composition as adjacent portions of adjacent layers, but the present disclosure is not so limited and may include adjacent layers with different material mixtures and/or compositions. In some embodiments, an organic binder or adhesive may be used to bind a composition deposited in a layer during the manufacturing process prior to sintering the layer. In some embodiments, the organic binder or adhesive may be mixed within the material composition prior to being deposited by the deposition device, the organic binder or adhesive may be applied through a separate feeder of the deposition device and simultaneously applied with the remaining material composition, or a layer of the organic binder or adhesive may be deposited between layers of the remaining material composition. In some embodiments, when applied separately from the material composition, the placement of the organic binder or adhesive may be selectively placed at some certain areas of the deposited material composition by the deposition device, and in fewer than all areas of the deposited material composition.

In one or more embodiments, an additive manufacturing process for a drill bit part may begin by taking a CAD model of the part and determining its placement within the "build box", also known as the substrate or area where the material deposition takes place, of the additive manufacturing instrument using a computer aided interface. In some embodiments, multiple CAD models of a bit head and/or shank may be arrayed within the build box to maximize the efficiency of the additive manufacturing process by completing multiple parts during the same deposition session. The additive manufacturing process may then proceed with the deposition of a layer of the material composition destined to form the part throughout the build box of the additive manufacturing instrument.

A binder or adhesive may optionally be applied to the specific areas of the build box where the CAD model was determined to be placed in the initial set-up of the build box. In some embodiments, the application of the adhesive or binder to the specific areas of the build box may be accomplished by spraying the adhesive or binder. After the application of the adhesive or binder, another layer of material composition may be layered throughout the build box of the additive manufacturing instrument and a binder or adhesive may be applied on the designated areas of the new material composition layer to form a second layer of the part. The process of layering the material composition throughout the build box followed by applying a binder or adhesive to the designated areas may be repeated until each layer forming the part is deposited. In other embodiments, rather than using an adhesive between adjacent deposited layers to hold the component together until further processing, each layer may be sintered as it deposited. The parts may then be harvested or removed from the build box for further processing or as finished bit heads and/or shanks.

Further processing may include the cleaning of the part to remove any material composition that is loosely connected or otherwise not bound to the part, machining threads or other components, polishing the part, and the like. In some embodiments, further processing may include heating the part to aid in the curing and consolidation of the part into a solid and suitably bound together mass capable of its intended function. In some embodiments, the part formed by the additive manufacturing process may undergo an infiltration process that further strengthens the bond of the material composition.

When a bit head and/or shank is printed by additive manufacturing, different materials may be deposited by additive manufacturing to form one or more material gradients through the part. Additive manufacturing may allow for gradient compositions at a near particle level, such that the gradient composition may have a continuous or near continuous change in composition through at least a portion of the gradient composition. As used herein, a gradient composition refers to a progressively increasing or decreasing amount (by percent composition) of one or more materials in the composition along the gradient. The amount of change may depend on, for example, the composition (e.g., including particle sizes, material types) and size of the gradient composition region. A gradient may have a continuously increasing/decreasing composition, a step-wise increasing-decreasing composition, or the like.

Compositions of a bit head and/or shank may include one or more of a wear or erosion resistant materials, such as transition metal carbide (e.g., tungsten carbide), a metallic binder, and steel, where different combinations of the materials and in different amounts may be distributed in different regions of the part. For example, a portion of the bit head forming a bit face may be formed of at least one matrix material such as tungsten carbide, and a threaded connection portion of the bit head may be formed of steel.

In some embodiments, a bit face of a bit head may be printed or otherwise formed with a first material, and a connection portion of the bit head for coupling to a shank may be printed with a second material, where the first material is harder or more wear or erosion resistant than the second material. For example, a composition forming a bit face portion of a bit head may include a mixture of tungsten carbide and metallic binder without steel, while a threaded connection portion of a bit head may have a composition absent tungsten carbide (or a lesser amount of tungsten carbide) that includes steel. In some embodiments, a bit head connection portion of a shank may be printed or otherwise formed with a first material, and a bit connection portion of the shank may be printed or otherwise formed with a second material, where the second material has a greater toughness than the first material. For example, a composition forming a first end of a shank that is to be connected to a bit head may include a first type of steel, while a bit connection portion of the shank may have a composition of a second type of steel that is tougher than the first type of steel (e.g., tool steel).

A bit head and a shank according to embodiments of the present disclosure may be attached by inserting the shank connection portion of the bit head into the bit head connection portion of the shank. The bit head connection and shank connection may have corresponding threads formed thereon, where the bit head connection may be threaded to the shank connection. The axial length of the bit head connection may be substantially equal to the axial length of the shank connection, such that a base surface of the shank connection may contact a base surface of the bit head connection, and a shoulder surface of the shank may contact a shoulder surface of the bit head to form a metal-to-metal or other similar sealing surface.

Figure 10:
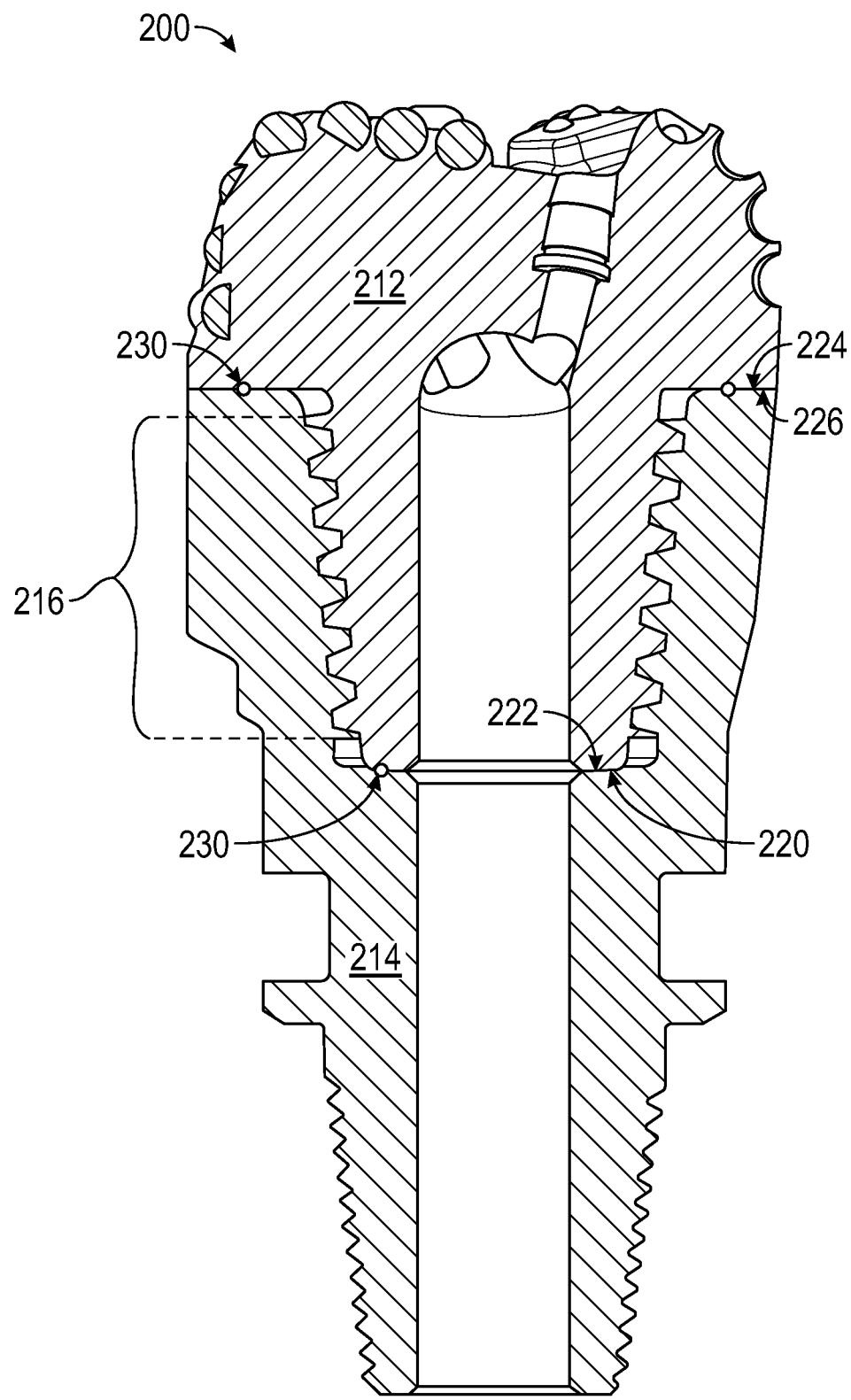
FIG. 10 is a cross-sectional view of a drill bit according to some embodiments of the present disclosure.

For example, referring now to FIG. 10, a cross-sectional view of a bit 200 is provided according to some embodiments of the present disclosure. The bit 200 includes a bit head 212 attached to a shank 214. The bit head 212 has a shank connection portion that is threaded into a bit head connection portion of the shank 214 to attached the bit head 212 and shank 214 by a threaded connection 216. The bit head connection and the shank connection may have substantially equal axial lengths, such that a base surface 220 of the shank connection may contact a base surface 222 of the bit head connection, and a shoulder surface 224 of the shank may contact a shoulder surface 226 of the bit head.

As shown, the base surfaces 220, 222 of the bit head connection and shank connection and the shoulder surfaces of the shank and bit head may extend radially away from a central axis of the bit, where each of the base and shoulder surfaces form radial or annular surfaces. In some embodiments, base and/or shoulder surfaces may be perpendicular or nearly perpendicular to a central axis of the bit. In other embodiments, however, it is envisioned that the surfaces may also be non-perpendicular relative to the central axis.

As shown, one or more seals 230 may optionally be positioned between the bit head 212 and shank 214 on one or more of the opposing axial ends of the threaded connection 216. The seals 230 may be positioned between the radial surfaces of the bit head 212 and shank 214, such as shown in FIG. 10, or one or more seals may be at a corner or elbow between a radial surface and axially extending threaded connection portion.

In some embodiments, the base surfaces of the bit head connection and shank connection may themselves sealingly engage each other and/or the shoulder surfaces of the bit head and shank may themselves sealingly engage each other to form one or more seals between the bit head and shank at one or both axial ends of the threaded connection between the bit head and shank.

According to some embodiments of the present disclosure, attaching a bit head to a shank may include brazing, welding, or otherwise securing a shoulder of the shank to a shoulder of the bit head. For example, braze material may be applied to a shoulder surface of a bit head and/or a shoulder surface of a shank prior to inserting a shank connection portion of the bit head into the bit head connection portion of the shank. When the braze material is sandwiched between the shoulder surfaces of the bit head and shank, the braze material may be heated to braze the bit head to the shank. Suitable braze materials may include, for example, aluminum, zinc, silver, and/or copper based alloys.

Figure 11:
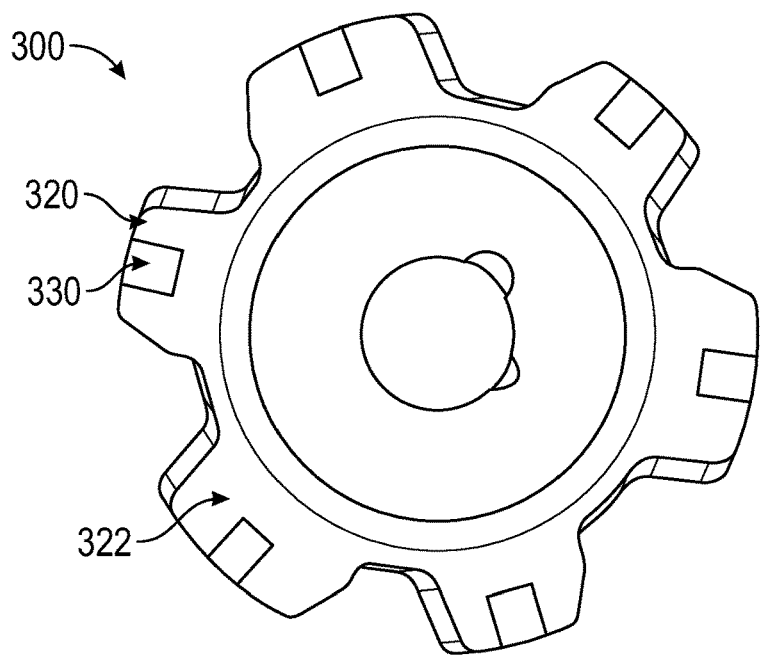
FIG. 11 is a top view of a shank, according to some embodiments of the present disclosure.
Figure 12:
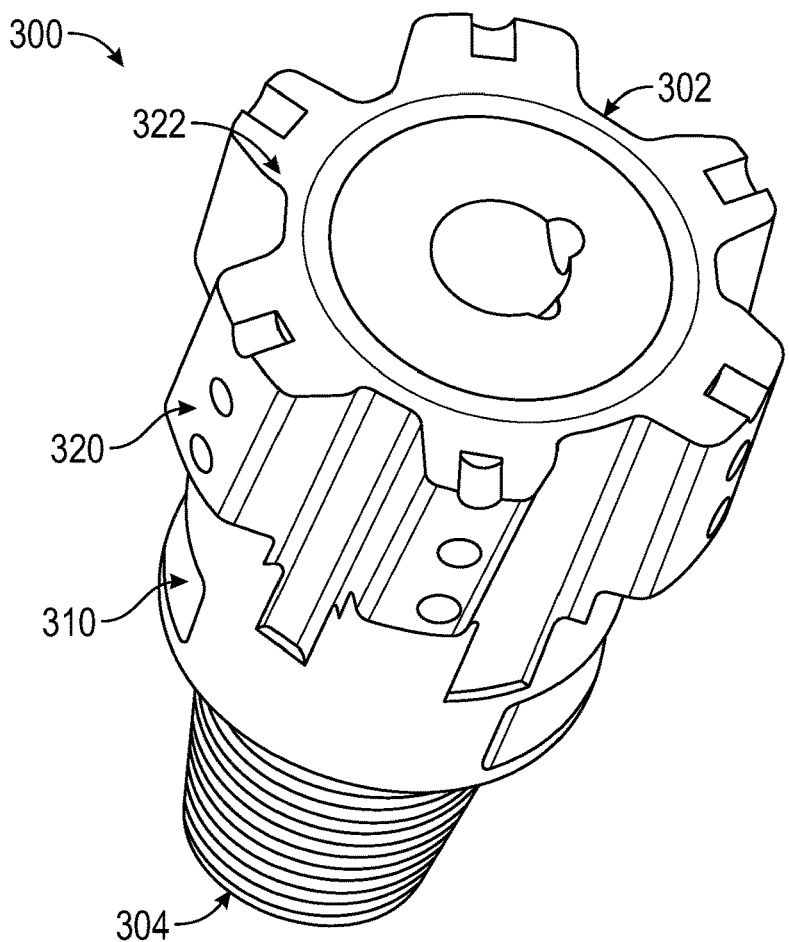
FIG. 12 is a perspective view of the shank of FIG. 11.

FIGS. 11 and 12 are top and perspective views, respectively, of a portion of a bit 300 according to some embodiments of the present disclosure. The bit 300 includes a shank 310 having a plurality of gage pads 320 spaced apart at different circumferential positions around the perimeter of the shank 310 and extending axially from a first axial end 302 of the shank 310. The gage pads 320 have a shank shoulder surface 322 extending radially away from a central axis of the shank and are at the first axial end 302 of the shank 310. A portion of a locking pocket 330 is formed in each of the shank shoulder surfaces 322 of the gage pads 320, where the portion of the locking pocket 330 extends a radial distance from an outer surface of the gage pads 320 and axially a depth into the shank from the shank shoulder surface 322. In some embodiments, a portion of a locking pocket may be formed in each gage pad shoulder surface, or in less than all of the gage pad shoulder surfaces. In FIGS. 11 and 12, a bit connection is formed at a second axial end 304 of the shank, opposite the first axial end 302.

Figure 13:
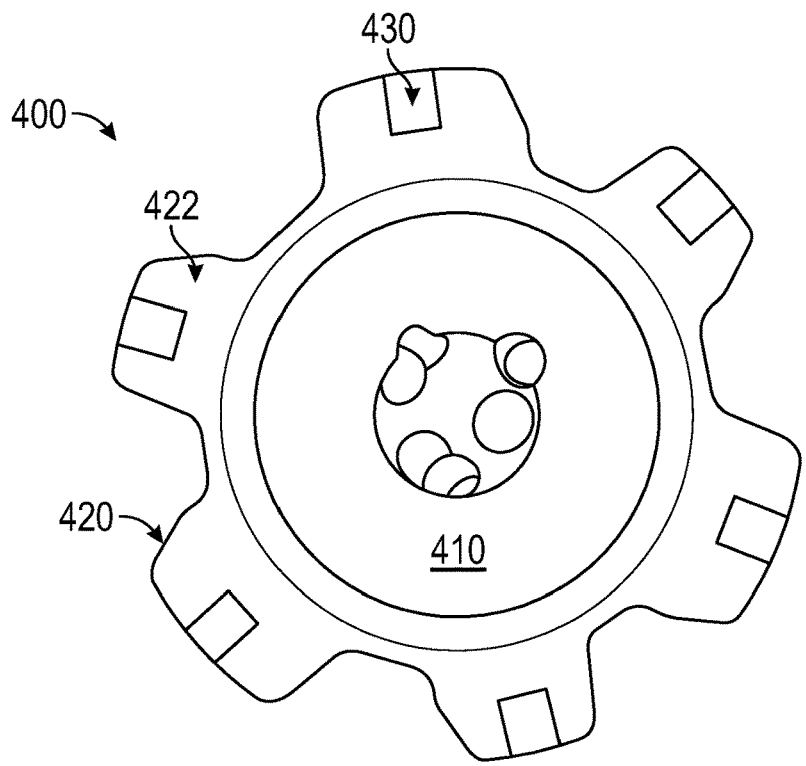
FIG. 13 is a bottom view of a bit head, according to some embodiments of the present disclosure.
Figure 14:
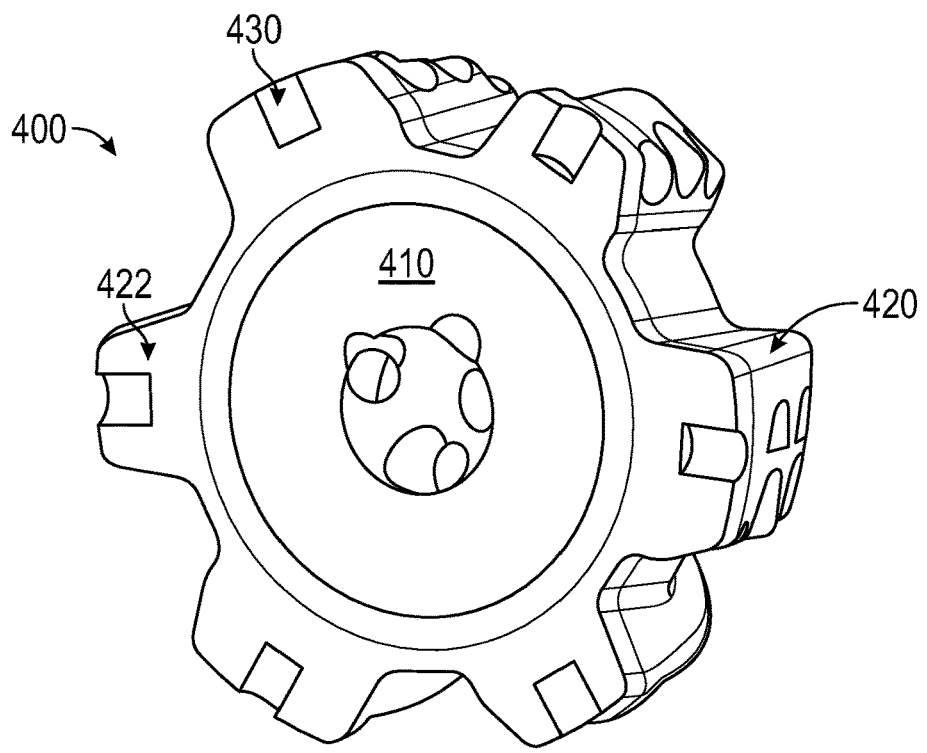
FIG. 14 is a perspective view of the bit head of FIG. 13.

FIGS. 13 and 14 are bottom and perspective views, respectively, of another portion of a bit 400 according to embodiments of the present disclosure. The bit 400 includes a bit head 410 having a plurality of blades 420 spaced apart at different circumferential/azimuthal positions around the perimeter of the bit head 410. The blades 420 may extend radially across a bit face from a position at or near a central axis of the bit 400, and axially along the bit head periphery to terminate at a bit head shoulder surface 422. A portion of a locking pocket 430 may be formed in each of the bit head shoulder surfaces 422 of the blades 420, where the portion of the locking pocket 430 extends a radial distance from an outer surface of the blades 420 toward the central axis and a depth into the bit head 410 from the bit head shoulder surface 422. In some embodiments, a portion of a locking pocket may be formed in some, but not all, of the bit head shoulder surfaces.

According to some embodiments of the present disclosure, a shank 310 and bit head 410 may be formed to have gage pads 320 and blades 420 positioned in the same circumferential/azimuthal positions around the perimeter of the shank 310 and bit head 410. Further, the size and shape of the shoulder surfaces 322, 422 formed at the gage pads and blades may be the same. In such embodiments, when the bit head 410 is attached to the shank 310, the bit head shoulder surfaces 422 may align with the gage pad shoulder surfaces 322, and may create sealing or engaging surfaces between the bit head 410 and the shank 310.

Aligned gage pads 320 and blades 420 of a shank 310 and bit head 410 may further have aligned portions of locking pockets 330, 430, such that a locking pocket extends radially through an interface between the shoulder surfaces 322, 422 of the gage pads and blades. An anchoring element may be inserted into the complete locking element to inhibit or even prevent relative rotation between the aligned gage pads 320 of the shank 310 and the blades 420 of the bit head 410.

Figure 15:
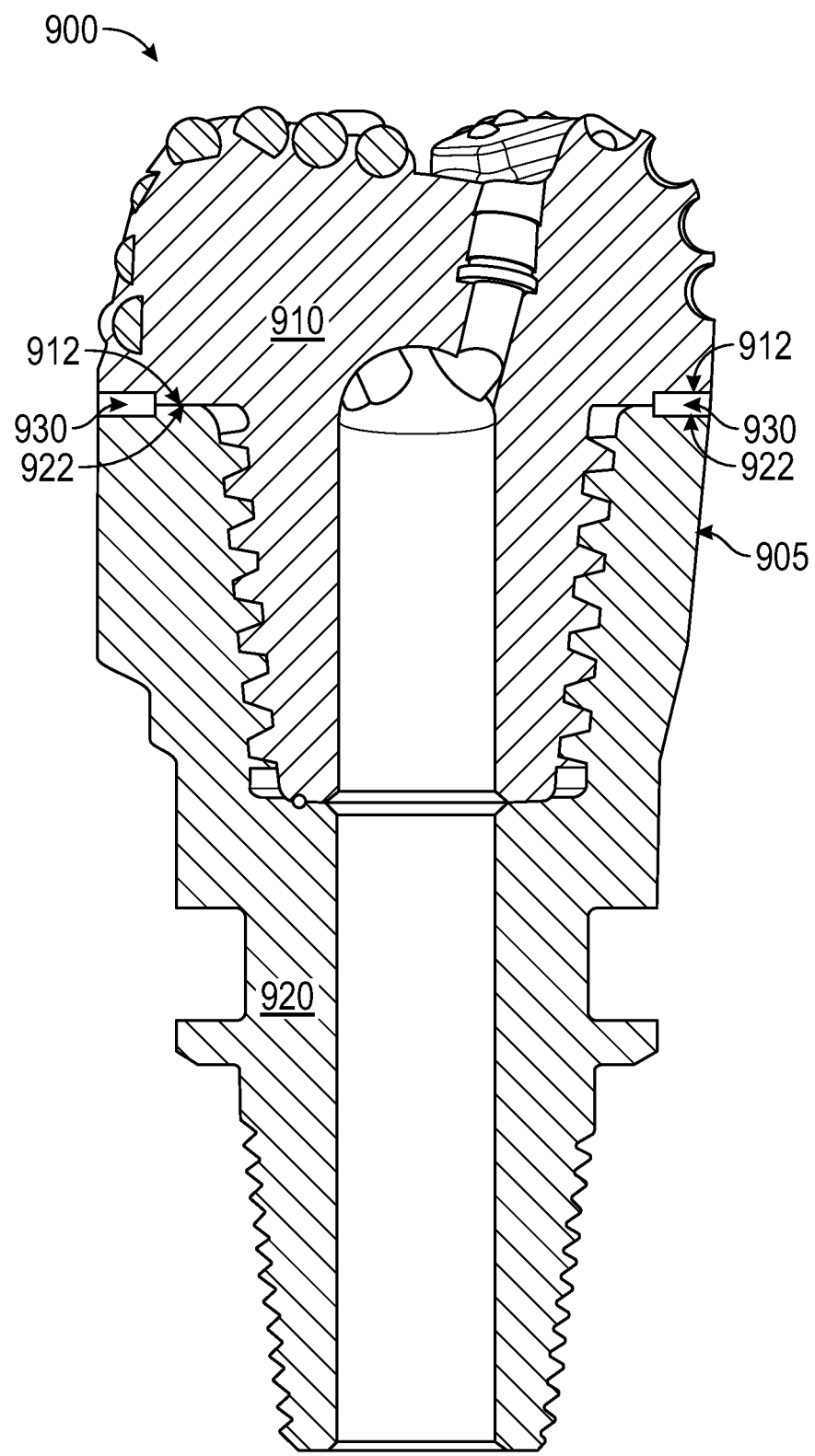
FIG. 15 is a cross-sectional view of a bit, according to some embodiments of the present disclosure.

In some embodiments, braze material, weld material, adhesives, or the like may be in a gap formed between the shank and bit head shoulder surfaces. An example braze material may, for instance, be heated to flow between the shoulder surfaces to then solidify and join the shoulder surfaces together. For example, FIG. 15 shows an embodiment where one or both shoulder surfaces 912, 922 of a bit head 910 and a shank 920 may have a recessed portion, such that when the bit head 910 and the shank 920 are assembled together and the shoulder surfaces 912, 922 are positioned to face each other, a gap 930 may be formed between a recessed portion of the shoulder surfaces 912, 922 with sufficient depth to allow braze material to fit there between. A gap 930 formed between the assembled together shoulder surfaces 912, 922 may range, for example, from about 0.25 mm to about 4 mm, in some embodiments. The recessed portion of one or both shoulder surfaces 912, 922 may be formed proximate to an outer surface 905 of the bit 900, while interior portions of the shoulder surfaces may contact each other when the bit head 910 and shank 920 are assembled together. In one or more embodiments, the recessed portion may extend from a selected radius from the bit center to the outer surface 905. For example, the recessed region may extend radially outwardly from a radial position having a radius that is less than the radius of an outer surface of a junk slot between blades. Thus, the recessed region may include the blades and bit body between blades. In some embodiments, an anchoring element may be placed in the recessed portion. The anchoring portion may be used with or without a braze or other material that couples the bit head 910 to the shank 920.

In some embodiments, more accurate alignment between a bit head and shank may be provided by forming the bit head and shank using additive manufacturing, such as electron beam or laser fusing additive manufacturing (where an electron beam or laser fuses layers of deposited materials together as they are deposited), binder jetting, or other direct additive manufacturing methods. For example, a fixed cutter drill bit may be modeled with a computer software program, where the bit is modeled to have a bit head and a shank according to embodiments of the present disclosure and blades extending axially along a length of the bit. The modeled bit parts may then be formed using additive manufacturing methods, where additive manufacturing methods may allow for controlled and relatively precise deposition of material to form the modeled dimensions of the bit parts. Thus, when the formed parts are assembled together, the parts may be more accurately aligned.

While the embodiments of the present disclosure have been described with respect to a limited number of embodiments and in connection with certain features, those skilled in the art, having benefit of this disclosure, will appreciate that other embodiments can be devised which do not depart from the scope of the present disclosure. For instance, features of different embodiments may be combined in any combination, except where such features are mutually exclusive. Accordingly, the scope of the present disclosure and the claims should include both the embodiments disclosed as well as combinations of features now known or later discovered, or equivalents within the scope of the concepts disclosed.

What is claimed is:

1. A method of forming a bit, comprising:
forming a bit head, the bit head including:
a bit face having a plurality of blades extending radially outwardly and defining a gage of the bit head; and
a shank connection at an opposite end of the bit head from the bit face;
forming a shank, the shank including:
a bit head connection at a first end of the shank, the first end of the shank having portions of blades with an outer diameter extending to the gage of the bit head; and
a bit connection at a second end of the shank, the second end being opposite the first end; and
attaching the bit head to the shank by using the shank connection of the bit head and the bit head connection of the shank, wherein the portions of the blades at the first end of the shank interface with the plurality of blades at the gage of the bit head, wherein attaching the bit head to the shank further includes inserting at least one anchoring element through an opening of a locking pocket, wherein the opening is defined by the bit head and the shank.

2. The method of claim 1, wherein forming the bit head includes forming the bit head by additive manufacturing.

3. The method of claim 2, wherein forming the bit head by additive manufacturing further includes:
forming the bit face with a first material; and
forming the shank connection with a second material that having a different hardness than the first material.

4. The method of claim 1, wherein forming the shank includes forming the shank by additive manufacturing.

5. The method of claim 4, wherein forming the shank by additive manufacturing includes:
forming the bit head connection with a first material; and
forming the bit connection with a second material having a different toughness than the first material.

6. The method of claim 1, further comprising:
machining junk slots into an outer surface of the first end of the shank and thereby defining one or more gage pads that correspond to one or more of the plurality of blades of the bit head.

7. The method of claim 1, wherein forming the bit head includes placing a first material into a mold of the bit head and infiltrating the first material.

8. The method of claim 1, wherein inserting at least one anchoring element includes fitting the anchoring element into the locking pocket formed in an outer surface of the bit at the gage of the bit head between the bit head and the shank, and engaging the at least one anchoring element with surfaces of both the bit head and the shank.

9. The method of claim 1, wherein attaching the bit head to the shank includes brazing or welding a shoulder of the shank to the bit head.

10. A bit, comprising:
a bit body including:
a bit head formed of at least one matrix material;
a shank formed of a shank material different from the at least one matrix material; and
a threaded connection between the bit head and the shank;
a plurality of blades extending radially outwardly from and axially along the bit body, the plurality of blades defining a gage region of the bit;
an anchoring element in a locking pocket in the gage region of the bit and at an interface between the bit head and the shank; and
a bit connection coupled to the bit body.

11. The bit of claim 10, the threaded connection including unified threads.

12. The bit of claim 10, further comprising:
a braze or weld material between a shoulder of the shank and the bit head.

13. The bit of claim 10, further comprising:
at least one seal between radial surfaces of the bit head and radial surfaces of the shank.

14. The bit of claim 10, an outer surface of the gage region of the blades extending along the shank including at least one cutting element or gage protection element.

15. A bit, comprising:
a bit body, including:
a bit head;
a shank; and
a threaded connection configured to secure the bit head to the shank;
a plurality of blades extending radially outwardly from a central axis of the bit body, an outer surface of the blades defining an axially continuous gage region, the plurality of blades being formed by separate portions on the bit head and on the shank, portions of the blades on the shank forming greater than 50% of a length of the gage region; and
a bit connection coupled to the shank of the bit body.

16. The bit of claim 15, further comprising:
a braze or weld material between a shoulder of the shank and a shoulder of the bit head.

17. The bit of claim 15, a bit face of the bit head being formed of at least one matrix material and a threaded connection portion of the bit head being formed of steel.

18. The bit of claim 15, further comprising:
a seal between the bit head and the shank on at least one axial end of the threaded connection.

19. The bit of claim 15, the bit connection including threads having a pitch smaller than a pitch of threads of the threaded connection.

20. The bit of claim 15, an axial length of the portions of the blades on the shank being greater than an axial length of a bit face portion of the bit head.

* * * * *